(12) United States Patent
Eichen et al.

(10) Patent No.: US 9,998,396 B2
(45) Date of Patent: Jun. 12, 2018

(54) METHOD AND SYSTEM FOR PROVIDING DYNAMIC ADMISSION CONTROL

(75) Inventors: Elliot G. Eichen, Arlington, MA (US); Lee N. Goodman, Tyngsboro, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 894 days.

(21) Appl. No.: 13/541,417

(22) Filed: Jul. 3, 2012

(65) Prior Publication Data

US 2014/0012971 A1   Jan. 9, 2014

(51) Int. Cl.
  *G06F 15/173* (2006.01)
  *H04L 12/927* (2013.01)
  *H04L 12/923* (2013.01)
  *H04L 12/911* (2013.01)

(52) U.S. Cl.
  CPC .......... *H04L 47/801* (2013.01); *H04L 47/762* (2013.01); *H04L 47/822* (2013.01)

(58) Field of Classification Search
  CPC . H04L 29/06027; H04L 47/10; H04L 67/142; H04L 67/14; H04M 7/0075
  USPC ........................................................ 709/224
  See application file for complete search history.

(56) References Cited

U.S. PATENT DOCUMENTS

| | | | |
|---|---|---|---|
| 6,738,390 B1* | 5/2004 | Xu et al. | 370/467 |
| 7,490,155 B1* | 2/2009 | Slowiak et al. | 709/227 |
| 7,649,848 B1* | 1/2010 | Swan et al. | 370/252 |
| 2006/0146792 A1* | 7/2006 | Ramachandran et al. | 370/352 |
| 2007/0076855 A1* | 4/2007 | MeLampy et al. | 379/88.17 |
| 2007/0078986 A1* | 4/2007 | Ethier et al. | 709/227 |
| 2007/0153813 A1* | 7/2007 | Terpstra et al. | 370/401 |
| 2007/0201448 A1* | 8/2007 | Baird et al. | 370/356 |
| 2008/0137541 A1* | 6/2008 | Agarwal et al. | 370/241 |
| 2008/0160976 A1* | 7/2008 | Virolainen et al. | 455/416 |
| 2008/0256237 A1* | 10/2008 | Liu | 709/226 |
| 2009/0055473 A1* | 2/2009 | Synnergren | 709/204 |
| 2009/0100147 A1* | 4/2009 | Igarashi | 709/218 |
| 2009/0298521 A1* | 12/2009 | Finlayson | 455/500 |
| 2010/0017509 A1* | 1/2010 | Frankkila et al. | 709/224 |
| 2012/0213221 A1* | 8/2012 | Xie et al. | 370/389 |
| 2012/0307647 A1* | 12/2012 | King et al. | 370/241 |

* cited by examiner

*Primary Examiner* — Anthony Mejia
*Assistant Examiner* — Blake Rubin

(57) ABSTRACT

An approach for monitoring a media streaming session for a change to one or more resources negotiated outside of a session signaling channel, wherein the one or more resources relate to establishment of the media, and determining whether to accept a new media streaming session based on the change.

21 Claims, 6 Drawing Sheets

METHOD AND SYSTEM FOR PROVIDING DYNAMIC ADMISSION CONTROL

BACKGROUND INFORMATION

In general, one or more components of a communication system or network track the number of media streaming sessions and the resources associated with the sessions within the network. Upon a request for a new session, the components can determine whether to accept the new session based on whether there are sufficient resources to handle the session. The determination relies on considering the initial negotiation that occurs between the endpoints of existing sessions and the determined the resources used to establish the existing sessions. However, if the required resources change during the existing sessions, the one or more components of the network are unable to account for the change causing a breakdown in the system when new sessions are accepted without considering current available resources.

Based on the foregoing, there is a need for accounting for the changes in required resources associated with media streaming sessions that occur during the sessions.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for monitoring for changes to resources within a media streaming session, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
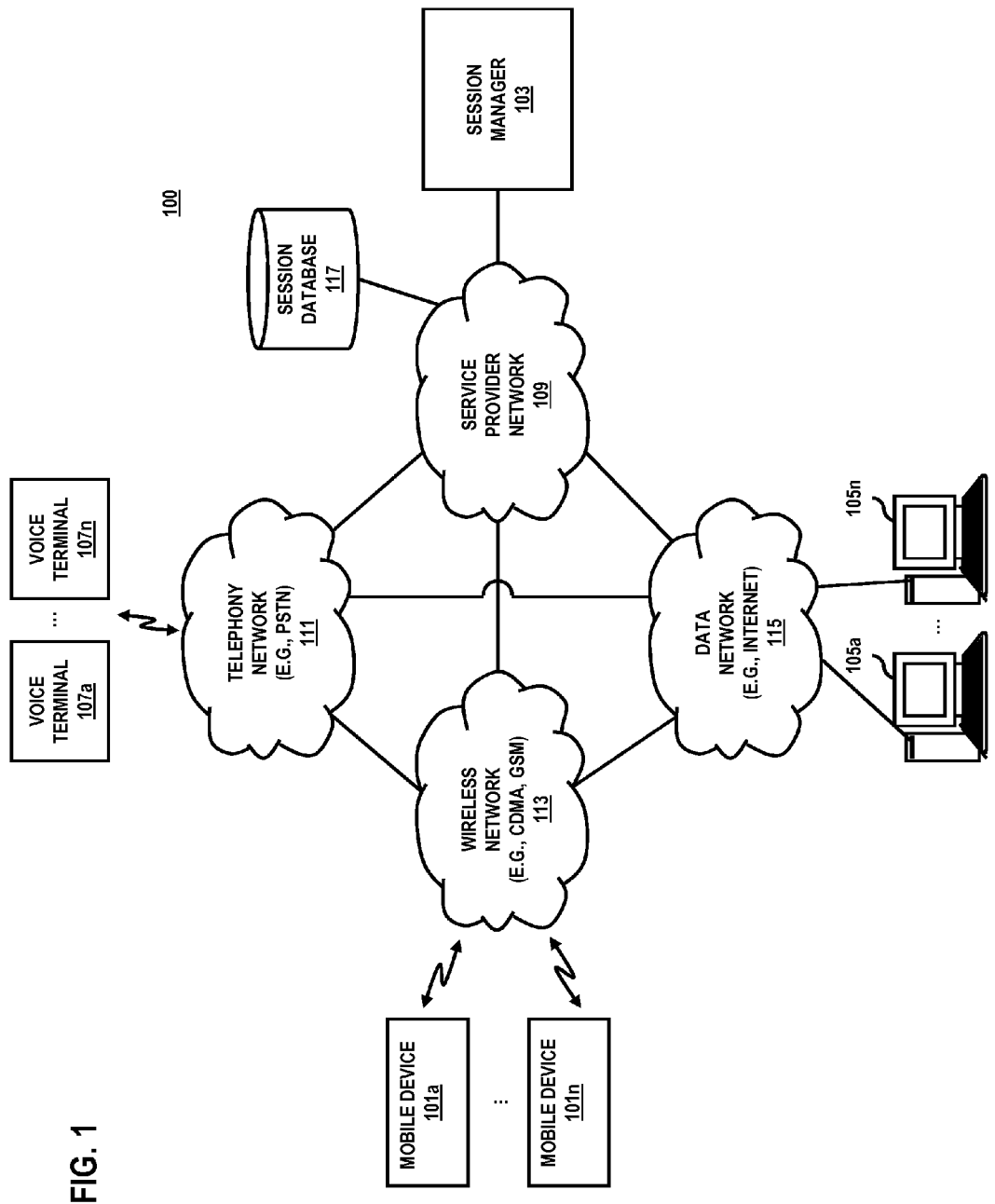
FIG. 1 is a diagram of a system capable of accounting for the changes in resources associated with media streaming sessions that occur during the sessions, according to one embodiment.

FIG. 1 is a diagram of a system 100 capable of monitoring for changes to resources within a media streaming session, according to one embodiment. As discussed, in general, networks perform admission control by tracking the number of media streaming sessions (e.g., communication sessions) and the resources required to support each of the sessions. By way of example, a component (e.g., node or element) within the network (which may be a real-time, packet-based communication network) may include a session border controller (SBC). Such a component is used for admission control for real-time, packet-based communication networks. When a new session is about to be initiated, the network component is queried to determine whether to accept or reject the new session. The determination is made based on some understanding of whether sufficient network resources are available to handle the new session. Such network resources may include, for example, access network bandwidth, media server ports, etc. For example, if a node of a network is serviced with bandwidth L, and each new media streaming session requires bandwidth B, as long as the number of current sessions is less than L/B−1, the network can support the new session without a loss in performance.

Such admission control works because of properties of the media encoding used for the media streaming session. The resources for the session (e.g., average bandwidth of the session) are negotiated during the session setup between endpoints associated with the session. In a communication system that uses session initiation protocol (SIP), the media encoding is negotiated during call setup through the exchange of end-point capabilities expressed using the session description protocol (SDP) encapsulated with a SIP message. The component of the network that provides admission control (e.g., the SBC) can monitor the negotiation and determine the negotiated resources based on the session signaling channel used during the negotiation of the session.

By way of example, the system 100 utilizes IP telephony signaling that includes, for example, the H.323 protocol and the Session Initiation Protocol (SIP). The H.323 protocol, which is promulgated by the International Telecommunication Union (ITU), specifies a suite of protocols for multimedia communication. SIP is a competing standard that has been developed by the Internet Engineering Task Force (IETF). SIP is a signaling protocol that is based on a client-server model. It should be noted that both the H.323 protocol and SIP are not limited to IP telephony applications, but have applicability to multimedia services in general. In an embodiment of the present invention, SIP is used to create and terminate voice calls over an IP network. However, it is understood that one of ordinary skill in the art would realize that the International Telecommunications Union (ITU) H.323 protocol suite and similar protocols can be utilized in lieu of SIP.

For example, a node within a network may be an enterprise serviced by a SIP Trunk to handle voice over Internet Protocol (VoIP) calls. If the trunk is a clear-channel T1 with 1.2 Mb/s of available bandwidth, and each call occupies 42.5 kb/s of bandwidth (e.g., each call uses the G.729 codec of 15.kb/s and 20 msec frames), new calls can be supported as long as the number of existing calls is less than 28. The network component that provides admission control can determine the number of sessions and the resources of the sessions by monitoring the session signaling channel used between the endpoints during the session negotiation. Based on the resources negotiated during the call negotiation through the session signaling channel, the network component keeps track of the number of sessions on the access link and the resources associated with the sessions based on the originally negotiated resources. Before accepting a new call, the component checks to make sure that there is sufficient resources (e.g., bandwidth) to support the new call by checking the resources determined during the negotiation of the existing calls.

The approach of the system 100 stems, in part, from the recognition that keeping track of the potential changes in the sessions occurs when resources for a given session are negotiated within the session signaling channel (e.g., within the SIP signaling for a given session). However, if the resources of the sessions change during the call and/or the changes are not negotiated within the call signaling channel that is monitored by the component, the network component responsible for keeping track of the resources cannot detect the change. Thus, issues within the network may result. Resources of the network may be underutilized where sessions are rejected that could have been handled, or resources of the network may be over utilized where sessions are accepted for which the network cannot handle the resources. The approach of the system 100 addresses these issues, according to certain embodiments.

As shown, the system 100 includes a session manager 103 implemented as, for example, part of a service provider network 109 that monitors for changes to resources within a media streaming session within the service provider network 109. In one embodiment, the session manager 103 may be, for example, a session border controller. The system 100 may also include a session database 117 implemented as, for example, part of the service provider network 109 for storing information regarding resources of one or more media streaming sessions monitored by the session manager 103. The system 100 may further include a telephony network 111, a wireless network 113 and a data network 115. In one embodiment, the session manager 103 may monitor for changes to resources within a media streaming session associated any one of the networks 109-115, or any combination of the networks 109-115. In alternative embodiments, the session manager 103 and/or the session database 117 could be implemented as any part of the system 100.

For illustrative purposes, the networks 109-115 may be any suitable wireline and/or wireless network, and be managed by one or more service providers. For example, telephony network 111 may include a circuit-switched network, such as the public switched telephone network (PSTN), an integrated services digital network (ISDN), a private branch exchange (PBX), or other like network. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109-115 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

According to exemplary embodiments, end user devices (e.g., mobile devices 101a-101n (referred to as mobile devices 101), computing devices 105a-105n (referred to as computing devices 105), and voice terminals 107a-107n (referred to as voice terminals 107)) may be utilized to establish media streaming session between each other to communicate over the system 100. The end user devices may include any customer premise equipment (CPE) capable of sending and/or receiving information over one or more of networks 109-115. For instance, voice terminals 107 may be any suitable plain old telephone service (POTS) device, facsimile machine, etc., whereas mobile devices 101 may be any cellular phone, radiophone, satellite phone, smart phone, wireless phone, or any other suitable mobile device, such as a personal digital assistant (PDA), pocket personal computer, tablet, customized hardware, etc. Further, computing devices 105 may be any suitable computing device, such as a VoIP phone, skinny client control protocol (SCCP) phone, session initiation protocol (SIP) phone, IP phone, personal computer, softphone, workstation, terminal, server, etc.

Under the example of FIG. 1, two or more of the mobile devices 101, the computing devices 105 and/or the voice terminals 107 may initiate a media streaming session. A node and/or access link within, for example, the service provider network 109 may handle the media streaming session between the two endpoints. As discussed above, the node and/or access link may be an enterprise service by a SIP trunk that handles VoIP calls, such as VoIP video conferencing calls. The two endpoints may negotiate resources of the media streaming session during the initial negotiation of the session through, for example, a session signaling channel that uses SIP. These properties may include, for example, what codec to use for the media streaming session. The properties therefore affect or define the resources associated with establishing and maintaining the media streaming session. In one embodiment, the session manager 103 monitors the establishment of the media streaming sessions.

Further, for some media streaming sessions, the properties and/or resources may be re-negotiated during the media streaming session. For example, the bandwidth associated with a video streaming session may be increased to support higher definition video. Further, such negotiation may occur outside of a session signaling channel and instead occur through the transmission of the video stream itself. For example, such negotiation may occur in a real-time transfer protocol (RTP). The session manager 103 also monitors for a change to one or more resources of the media streaming session that occurs during the media streaming session and that may occur outside of a session signaling channel. Thus, the session manager 103 monitors for a change to one or more resources that is negotiated outside of a session signaling channel that would otherwise not be detected solely considering the initial negotiation that occurs to establish the media streaming session. In the case of the above example, the session manager 103 monitors the RTP for changes in the bandwidth of the video streaming session and considers these changes when determining whether to accept new media streaming sessions. Accordingly, the session manager 103 can provides a way to consider dynamic changes to the resources associated with a network node and/or access link that provides media streaming sessions to avoid under using or over using such network resources leading to, for example, the loss of quality of service.

Figure 2:
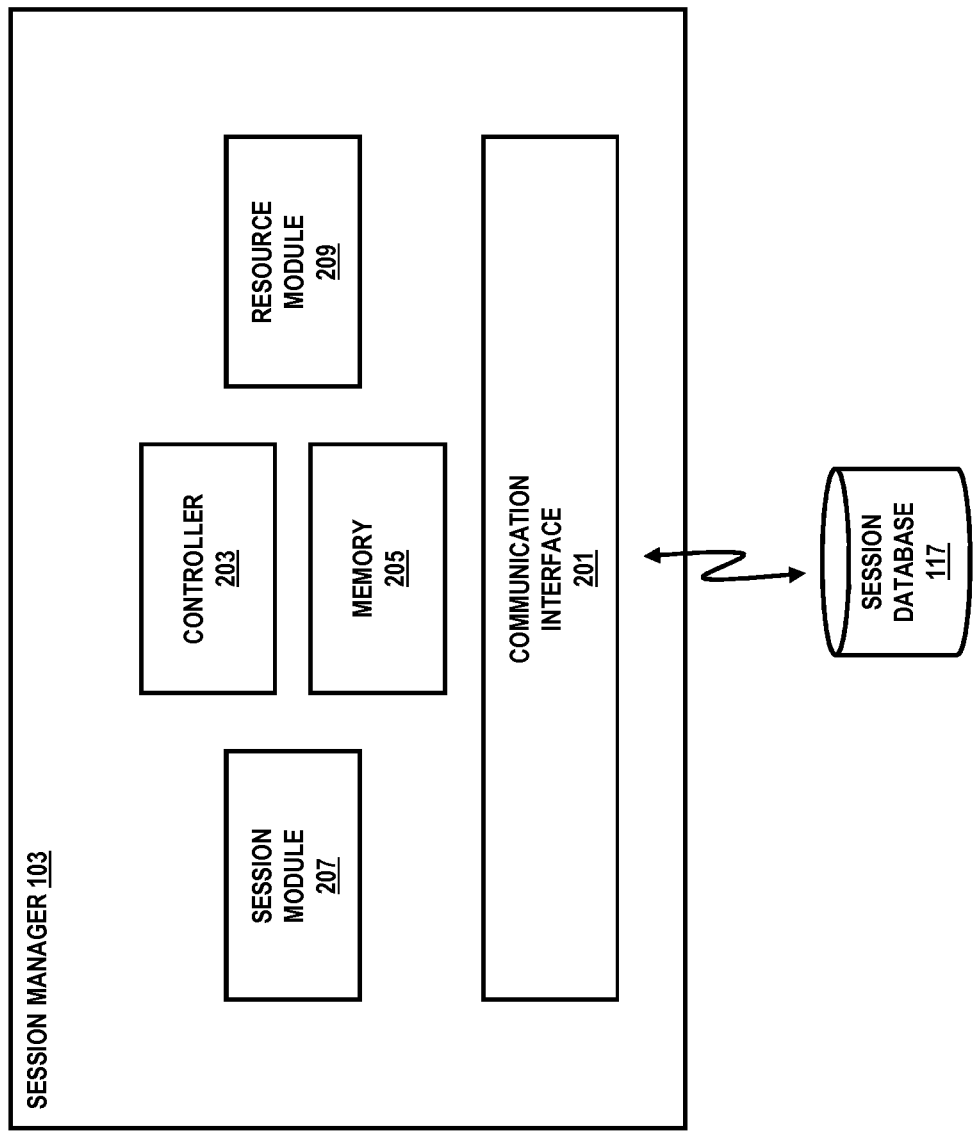
FIG. 2 is a diagram of a session manager capable of accounting for the changes in required resources associated with media streaming sessions that occur during the sessions, according to one embodiment.

FIG. 2 is a diagram of the components of a session manager 103, according to one embodiment. The session manager 103 may comprise computing hardware (such as described with respect to FIG. 6), as well as include one or more components configured to execute the processes described herein for monitoring for changes to resources during a media streaming session. It is contemplated that the functions of these components may be combined in one or more components or performed by other components of equivalent functionality. By way of example, the functions and or components of the session manager 103 may be incorporated into existing session border controllers to provide existing session border controllers with the functions described herein. In one implementation, the session manager 103 includes a communication interface 201, a controller (or processor) 203, memory 205, a session module 207, and a resource module 209.

The controller 201 may execute one or more algorithms for executing functions of the session manager 103. The controller 201 may interact with the memory 205 in executing the one or more algorithms, such as obtaining one or more lines of code from the memory 205 and/or temporarily storing information within the memory 205. Further, the controller 201 may interact with the session module 207 to determine media streaming sessions associated with the system 100. The session module 207 may track the number of media streaming sessions associated with the various nodes within the service provider network 109, or within the system 100. The session module 207 may interface with the session database 117 for storing information regarding one or more media streaming sessions associated with the service provider network, or any network within the system 100. In one embodiment, the session module 207 interfaces with the plurality of endpoints when the endpoints initially negotiate the media streaming sessions and or negotiate changes to the resources during the media streaming sessions.

The controller 203 may execute one or more algorithms associated with interacting with the resource module 209 to determine the resources associated with nodes and/or access links within the network servicing the media streaming sessions. The resource module 209 may determine the resources the nodes and/or access links can handle and the resources associated with each of the media streaming sessions currently handled by the nodes and/or access links. By way of the above example, where a node is an enterprise serviced by a SIP Trunk to handle VoIP video calls, the resource module 209 may determine the resources (e.g., bandwidth) associated with each of the VoIP video calls and the number of available media ports associated with the node. The resource module 209 further determines the resources associated with the media streaming sessions between endpoints as requests for new media streaming sessions are received so that the session manager 103 can determine whether to accept the new media streaming sessions based on the current resources and expected resources of all media streaming sessions.

The controller 201 may further utilize the communication interface 211 to communicate with other components of the session manager 103, the mobiles devices 101, computing devices 105, voice terminals 107, or any other components of the system 100. The communication interface 211 may include multiple means of communication. For example, the communication interface 211 may be able to communicate over short message service (SMS), multimedia messaging service (MMS), Internet Protocol (IP), instant messaging (IM), voice sessions (e.g., via a phone network), email, or other types of communication.

Figure 3:
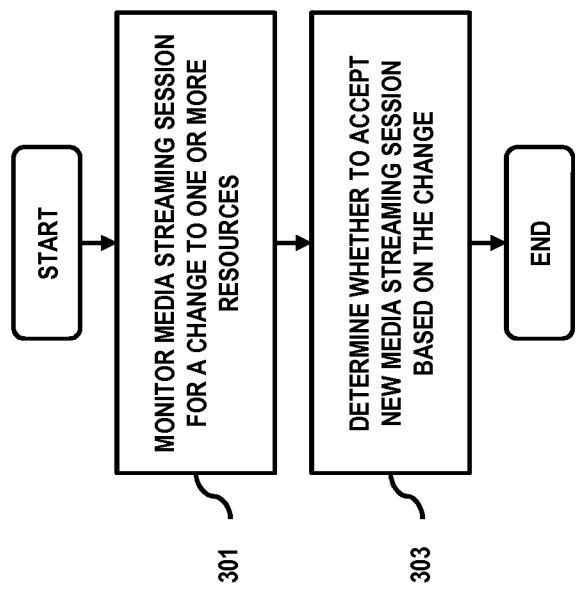
FIG. 3 is a flowchart of determining whether to accept a new media streaming session based on tracking required resources of existing sessions, according to one embodiment.
Figure 6:
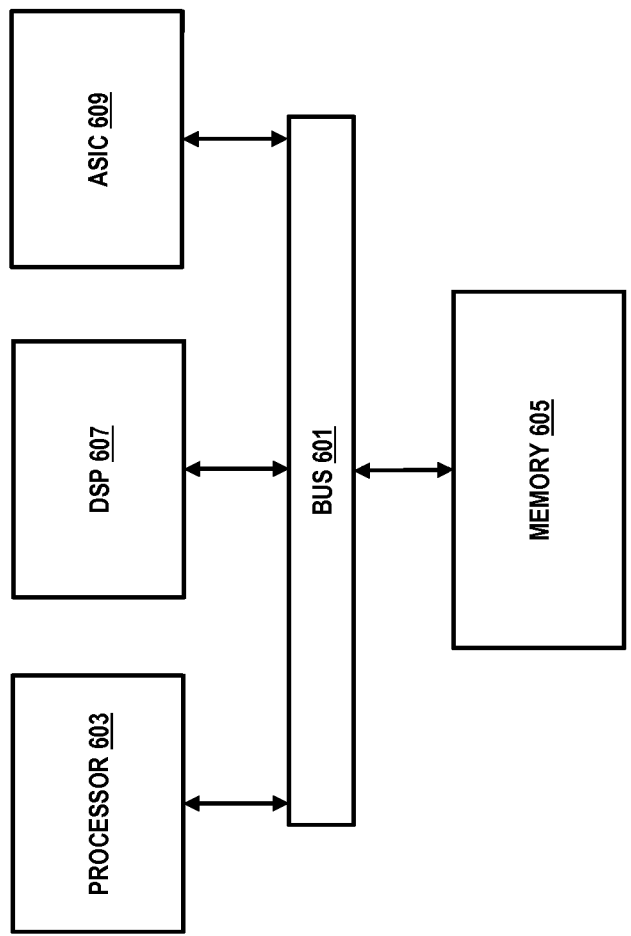
FIG. 6 is a diagram of a chip set that can be used to implement various exemplary embodiments.

FIG. 3 is a flowchart of determining whether to accept a new media streaming session based on tracking required resources of existing sessions, according to one embodiment. In one embodiment, the session manager 103 performs the process 300 and is implemented in, for instance, a chip set including a processor and a memory as shown in FIG. 6.

In step 301, the session manager 103 monitors a media streaming session for a change to one or more resources negotiated outside of a session signaling channel. The one or more resources relate to establishment of the media, such as determining the type of media, the codec associated with the session, the bandwidth required for the session, etc. The session manager 103 may monitor the delivered audio and/or video to determine any changes in the resources associated with the media streaming session. By way of example, the session manager 103 may monitor bandwidth changes negotiated between two endpoints associated with the media streaming session that is negotiated in the RTP. As the bandwidth exchanged between two endpoints increases to, for example, permit the exchange of video at higher resolutions and/or detail, the session manager 103 may detect the change in the bandwidth. In one embodiment, the session manager 103 may update one or more resources associated with one or more media streaming sessions saved in the session database 117 based on a determined change to one or more of the resources of the streaming session.

The monitoring may occur continuously, periodically or on-demand. In one embodiment, the session manager 103 may monitor transmission statistics associated with the media streaming sessions, such as statistics transmitted in a real-time transport control protocol (RTCP). Based on the transmission statistics, the session manager 103 may change the monitoring of the changes to the media streaming sessions. For example, based on quality of service statistics associated with a media streaming session, the session manager 103 may begin to monitor for changes to media streaming sessions.

In one embodiment, the session manager 103 may execute a negotiation between a plurality of endpoints of the change to the one or more resources of the media streaming session. Based on the execution of the negotiation, the session manager 103 may directly know the change in the resource that was negotiated by the plurality of the endpoints without having to indirectly monitor for the change. By way of example, when the session manager 103 executes a negotiation with the plurality of the endpoints, the negotiation occurs outside of a session signaling channel, such as being negotiated in the RTP.

Upon determining a change to one or more resources of a media streaming session, in step 303 the session manager 103 determines whether to accept any new media streaming session based on the change. Where the change indicates that any additional media streaming session may cause quality of service issues, the session manager 103 may reject new media streaming sessions associated with a particular node and/or access link. The media streaming session may be diverted to another node and/or access link that may handle the additional resources associated with the media streaming session. Accordingly, by monitoring for changes in existing media streaming sessions, rather than relying on the initial negotiation of the sessions and/or negotiation that occurs within a session signaling channel, the session manager 103 is able to provide admission control that is based on dynamic, up-to-date information regarding the resources that a network node and/or access link can handle with respect to new media streaming sessions, such as new video streaming sessions.

Figure 4:
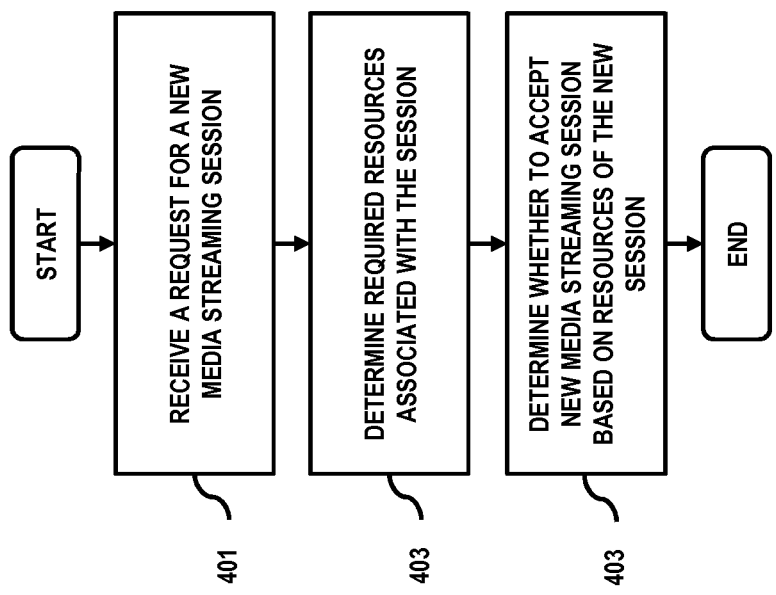
FIG. 4 is a flowchart of determining whether to accept a new media streaming session based on tracking required resources of existing sessions and the required resources of the new session, according to one embodiment.

FIG. 4 is a flowchart of determining whether to accept a new media streaming session based on tracking required resources of existing sessions and the required resources of the new session, according to one embodiment. In one embodiment, the session manager 103 performs the process 400 and is implemented in, for instance, a chip set including a processor and a memory as shown in FIG. 6.

In step 401, the session manager 103 receives a request for a new media streaming session. The request may originate from any one of the mobile devices 101, the computing devices 105, and/or the voices terminals 107. The request may be for any type of media streaming session, such as an audio streaming session, a video streaming session, or a video streaming session that includes audio, such as a VoIP video conferencing call.

In step 403, the session manager determines the required one or more resources associated with the new media streaming session based on the request. The one or more resources may include, for example, one or more of a bandwidth of the media streaming session, a codec of the media streaming session and a number of available ports of a network node handling the media streaming session. By way of example, where the media streaming session is a video streaming session, the video streaming sessions may be associated with the H.263 codec and use 128 kb/s of bandwidth.

In step 405, the session manager 103 determines whether to accept the new media streaming session based on the required resources of the new media streaming session. Thus, if a node and/or an access link handling the new media streaming session has the capacity for 1024 kb/s of bandwidth without any load, the node and/or access link could potential handle 8 media streaming sessions similar to the new media streaming session associated with the request (H.263 codec using 128 kb/s of bandwidth). If there are currently less than, e.g., 7 media streaming sessions using the H.263 codec at 128 kb/s, the session manager 103 determines that the node and/or access link can handle the new media streaming session. However, because the session manager 103 allows for the dynamic determination of the resources being consumed at a node and/or an access link associated with providing media streaming sessions, the session manager 103 is able to consider changes to the existing media streaming sessions at the node and/or the access link that occurred since the initial negotiation and/or that occurred outside of a session signaling channel.

Thus, if at the time of the above request there were already 7 media streaming sessions currently using the node and/or access link that supports 1024 kb/s of bandwidth, but one of the media streaming sessions was associated with a change negotiated between the endpoints in the required bandwidth outside of the session signaling channel, the session manager 103 is able to determine the change and account for the change when accepting new media streamlining sessions. Thus, for example, if one of the 7 media streaming sessions negotiated an increase of bandwidth from 128 kb/s to 256 kb/s, the session manager 103 can determine the increase in bandwidth and determine that the increase in the bandwidth negotiated for the one media streaming session effectively decreased the number of media streaming sessions the node can handle from 1 down to 0. Thus, the session manager 103 would reject any new media streaming session associated with the node to avoid over utilizing the node and decreasing the quality of service of the other media streaming sessions associated with the node. Accordingly, the session manager 103 is able to provide admission control in considering the current resources consumed by a node and/or access link rather than based on the resources that were negotiated between a plurality of endpoints at the initial negotiation of a media streaming session.

The processes described herein for providing dynamic admission control may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
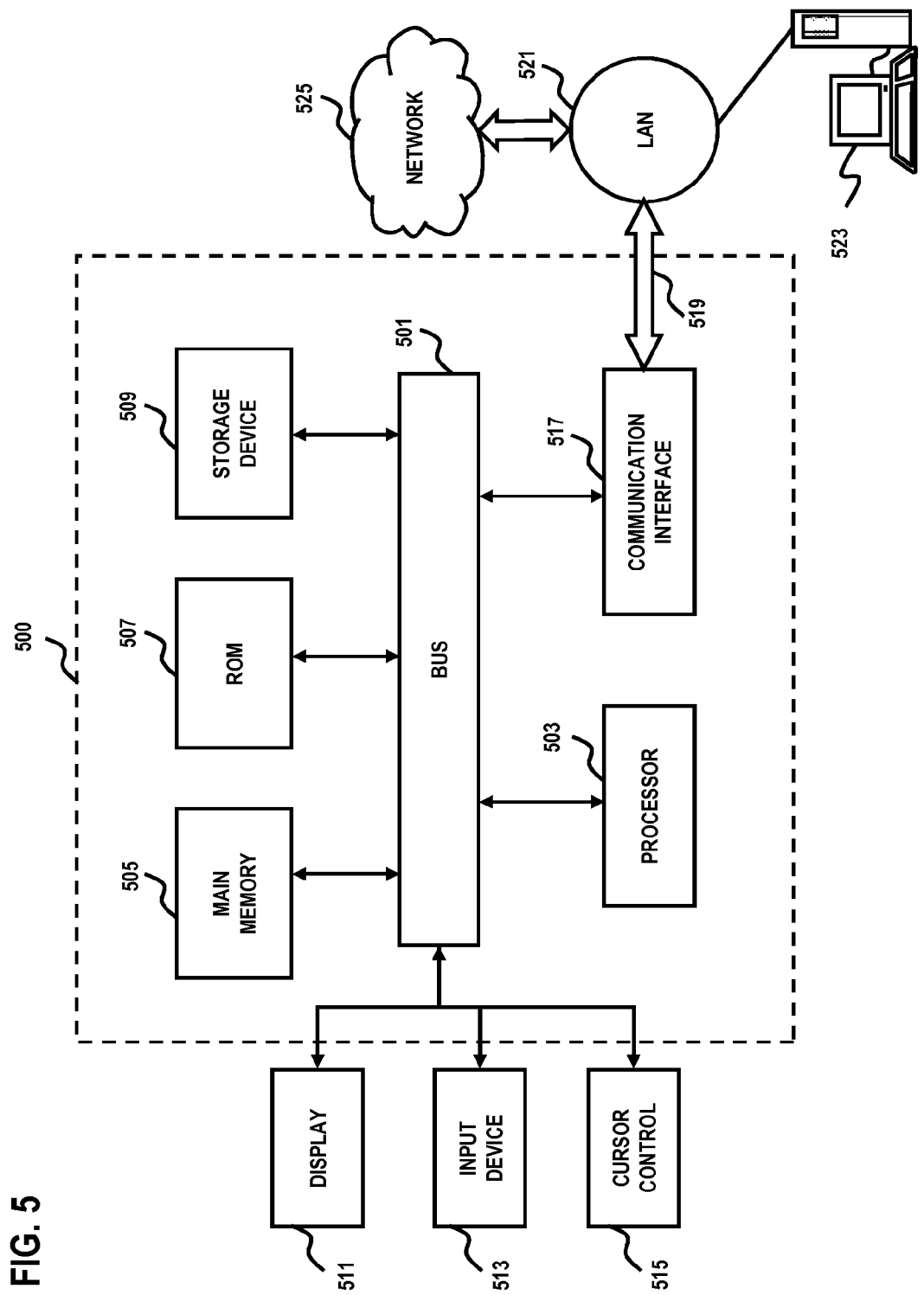
FIG. 5 is a diagram of a computer system that can be used to implement various exemplary embodiments.

FIG. 5 illustrates computing hardware (e.g., computer system) upon which an embodiment according to the invention can be implemented. The computer system 500 includes a bus 501 or other communication mechanism for communicating information and a processor 503 coupled to the bus 501 for processing information. The computer system 500 also includes main memory 505, such as random access memory (RAM) or other dynamic storage device, coupled to the bus 501 for storing information and instructions to be executed by the processor 503. Main memory 505 also can be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set 600 upon which an embodiment of the invention may be implemented. Chip set 600 is programmed to present a slideshow as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of FIGS. 3 and 4.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   monitoring a media streaming session for a change to one or more resources negotiated outside of a session signaling channel,
       wherein the session signaling channel is one of a plurality of session signaling channels, the one or more resources relate to network resources required for establishment of media streaming by each of the plurality of session signaling channels, and the one or more resources include current resources and expected resources of all media streaming sessions; and
   determining whether to accept a new media streaming session in the session signaling channel based on the change to the one or more resources negotiated outside of the session signaling channel.

2. The method according to claim 1, further comprising:
   executing a negotiation between a plurality of endpoints of the change to the one or more resources of the media streaming session,
       wherein the negotiation is outside of the session signaling channel.

3. The method according to claim 1, further comprising updating a session resource table based on the change.

4. The method according to claim 1, further comprising:
   receiving a request for the new media streaming session;
   determining required one or more resources associated with the new media streaming session based on the request; and
   determining whether to accept the new media streaming session based on the change and the required one or more resources.

5. The method according to claim 1, wherein the media streaming session is a video streaming session.

6. The method according to claim 1, wherein the change to the one or more resources are negotiated through a real-time transport protocol.

7. The method according to claim 1, wherein the one or more resources include one or more of a bandwidth of the media streaming session, a codec of the media streaming session and a number of available ports of a network node handling the media streaming session.

8. An apparatus comprising:
   a processor configured to
       monitor a media streaming session for a change to one or more resources negotiated outside of a session signaling channel,
           wherein the session signaling channel is one of a plurality of session signaling channels, the one or more resources relate to network resources required for establishment of media streaming by each of the plurality of session signaling channels, and the one or more resources include current resources and expected resources of all media streaming sessions, and
       determine whether to accept a new media streaming session in the session signaling channel based on the change to the one or more resources negotiated outside of the session signaling channel.

9. The apparatus according to claim 8, wherein the processor is further configured to:
   execute a negotiation between a plurality of endpoints of the change to the one or more resources of the media streaming session,
       wherein the negotiation is outside of the session signaling channel.

10. The apparatus according to claim 8, further comprising:
    a session resource table,
        wherein the processor is further configured to update the session resource table based on the change.

11. The apparatus according to claim 8, wherein the processor is further configured to:
    receive a request for the new media streaming session,
    determine required one or more resources associated with the new media streaming session based on the request, and
    determine whether to accept the new media streaming session based on the change and the required one or more resources.

12. The apparatus according to claim 8, wherein the media streaming session is a video streaming session.

13. The apparatus according to claim 8, wherein the change to the one or more resources are negotiated through a real-time transport protocol.

14. The apparatus according to claim 8, wherein the one or more resources include one or more of a bandwidth of the media streaming session, a codec of the media streaming session and a number of available ports of a network node handling the media streaming session.

15. A system comprising:
    a resource monitoring platform configured to monitor a media streaming session for a change to one or more resources negotiated outside of a session signaling channel,
        wherein the session signaling channel is one of a plurality of session signaling channels, the one or more resources relate to network resources required for establishment of media streaming by each of the plurality of session signaling channels;
    and the one or more resources include current resources and expected resources of all media streaming sessions, and
    a signal controller coupled to the resource monitoring platform and configured to determine whether to accept a new media streaming session in the session signaling channel based on the change to the one or more resources negotiated outside of the session signaling channel.

16. The system according to claim 15, wherein the resource monitoring platform is further configured to:
    execute a negotiation between a plurality of endpoints of the change to the one or more resources of the media streaming session,
        wherein the negotiation is outside of the session signaling channel.

17. The system according to claim 15, wherein the resource monitoring platform is further configured to update a session resource table associated with the signal controller based on the change.

18. The system according to claim 15, wherein the signal controller is further configured to:
   receive a request for the new media streaming session,
      determine required one or more resources associated with the new media streaming session based on the request, and
   determine whether to accept the new media streaming session based on the change and the required one or more resources.

19. The system according to claim 15, wherein the change to the one or more resources are negotiated between a plurality of endpoints through a real-time transport protocol.

20. The system according to claim 15, wherein the signal controller comprises a session border controller.

21. The method according to claim 1, where monitoring the media streaming session comprises:
   monitoring bandwidth changes negotiated between two endpoints associated with the media streaming session.

\* \* \* \* \*